United States Patent [19]

Loomis

[11] Patent Number: 4,579,592

[45] Date of Patent: Apr. 1, 1986

[54] INSULATOR

[75] Inventor: Richard E. Loomis, Little Rock, Ark.

[73] Assignee: Gene Crandall, Port Bryon, N.Y.

[21] Appl. No.: 518,475

[22] Filed: Jul. 29, 1983

[51] Int. Cl.$^4$ ................................................ C09K 3/28
[52] U.S. Cl. ................ 106/18.11; 106/18.12; 106/18.13; 252/62; 162/159; 162/181.2; 162/181.6
[58] Field of Search ............... 106/18.11, 18.12, 18.13; 252/62; 162/159, 181.2, 181.6

[56] References Cited

U.S. PATENT DOCUMENTS

| | | | |
|---|---|---|---|
| 4,168,175 | 9/1979 | Shutt | 162/181.6 |
| 4,182,681 | 1/1980 | Gumbert | 106/18.13 |
| 4,292,188 | 9/1981 | Barone et al. | 162/159 |
| 4,311,554 | 1/1982 | Herr | 162/181.2 |
| 4,419,256 | 12/1983 | Loomis | 106/18.12 |

*Primary Examiner*—John Kight
*Assistant Examiner*—Garnette D. Draper
*Attorney, Agent, or Firm*—Bernard A. Reiter

[57] ABSTRACT

A new and improved insulating composition comprising a mixture of cellulose, boric acid and expanded silicate glass, and having a PH factor preferred in the range of 7 to 7.2, more or less.

20 Claims, No Drawings

INSULATOR

BACKGROUND OF THE INVENTION

The present invention pertains to the field of insulating material and relates to a generally free flowing composition which may be either applied as a loose fill or granular like product or as a wet spray in conjunction with an adhesive. By variance of the ratio of the respective components, the insulation composition hereof may serve as a minimal heat insulator, on the one hand, or in the extreme, as a fire retardant wall.

The invention hereof has found particularly useful application in the interior of metallic buildings.

In relatively recent years, the advent of metallic building structures, primarily for small office buildings and warehouses, has noticeably replaced or supplemented conventional wooden building structures. These metallic building structures are not readily amenable to the same type of insulating materials and methods as has been commonly been used heretofore with other building structures. Conventional building structures have in the past frequently been insulated with a variety of known insulation materials, such as asbestos or glass fiber compositions, such as is shown in U.S. Pat. No. 3,687,850, where there is disclosed a fiber composition structure useful at temperatures of about 2,000° F. and made out of silica and alumina fibers primarily. Fibers of this general type have heretofore been manufactured into thermal insulation compositions preformed into fiberglass batts or the like, and placed in sidewall cavities and attics. The fiberglass batts are sized to fit between upright studs in a wall cavity or horizontal joists in an attic. While such fiberglass batts provide good insulation properties, that is an R value (in hr-ft$^2$-F/BTU) of about 11 or 12, the installation of such fiberglass batts is not only difficult after construction of the building is completed, but sometimes, particularly in metal buildings or the like, is not feasible, because there may be no intermediate roof on which to lay the batt. Even if there is, it may become more desirable to simply "blow" the thermal insulation directly on the surface of the metal building, that is on the interior ceiling surface. This is quite acceptable, except where the heat insulation material contains the component of boric acid, a commonly used compound which is particularly corrosive to metal, and as a result, the boric acid must be neutralized or "buffered" with a chemical agent such a borax. The addition of borax to boric acid significantly increases the cost of the insulation material and adds relatively nothing to its principal objective, that is heat insulation. Now that the construction of metal buildings has risen dramatically and partially replaced conventional type building construction, and as a result significantly greater amounts of blown on insulation is being used, there is greater opportunity for economy and savings in construction if an improved thermal insulator were developed and in which the borax component were eliminated.

The present invention is thus directed to an improved thermal insulator in which borax and the like types of chemical buffers and/or neutralizers is eliminated. A principal advantage and feature of the invention thus exists in a thermal insulator having no per se chemical buffer or neutralizer.

A further feature and advantage of the invention exists in a thermal insulator composition providing improved thermal insulation as a result of the neutralizer ingredient itself.

A further feature and advantage of the invention resides in an improved insulator in which the buffer and/or neutralizer is an expanded glass.

A further feature and advantage of the invention resides in an insulating material in which the thermal transmission properties may be varied predictably by variance of the ratio of the constant composition components.

Yet another feature and advantage of the invention is an improved thermal insulator in which the heat transmission characteristics may be varied by adjustment of the ratio of the component ingredients so that heat insulation can be minimized and so that heat insulation can be maximized, the latter to the extent of presenting a substantial fire wall insulator.

Yet another feature and advantage of the invention resides in an insulating material which is less expensive than materials presently used while yet improving the overall heat insulating characteristics per unit of thickness thereof and which is granular in form so as to constitute that which is commonly referred to as "loose fill".

DESCRIPTION OF THE INVENTION

The present invention involves an improved thermal insulator comprising essentially three components of ingredients, and which is effective over a wide range of temperatures. The effectiveness of the thermal insulator hereof is related to the relative proportion of the various ingredients thereof. The present description will explain the manner in which the present heat insulation composition is manufactured, and the relationship and influence of the various components thereof on the heat insulation characteristics. It should be recognized that the present insulator may be manufactured in a variety of forms, these including, but not limited to, that which is commonly known as grandular like or loose fill, such as would be placed between the beams on an attic floor, or between studs in a building, and which may take the form of fabricated batts or the like; or the invention may take the form of a wet spray insulator introduced under pressure through the nozzle on a hose in connection with an appropriate adhesive directed into the stream of the insulator and onto a beam or other exposed surface of the building structure. In all instances of application, the heat insulating characteristic of the material may be varied so as to produce an insulator having only nominal insulating capacity, on the one hand, while, on the other, an insulator reaching Governmental standards for a two hour fire wall may be produced.

The invention comprises a mechanical mixture of cellulose or wood-like fiber, boric acid or borax, ammonium sulphate or aluminum sulphate and amorphous expanded silicate glass or perlite, zonalite or fermiculite. These constituents, each intended to perform their respective functions, may be varied to accomplish a broad range of thermal insulation capabilities. With a relatively high glass component, by weight, the composition is found to constitute a superior fire resistant agent. The composition also finds use as a sound absorbing agent.

The cellulose component of the invention may be provided in the form of wood shavings, for example, or preferably in the form of old newspapers intended to constitute the bulk of the product. The newspapers or other cellulose component must be thoroughly ground to a mushlike consistency, which is dry in character and therefore not unlike the fibrous appearance of rock wool. The processing of the cellulose to this appearance is best accomplished in a hammermill where the cellulose is fed to the mill on semi-continuous basis for production of the processed component. The processed component of cellulose is particularly light in weight, easily compressible, but highly absorptive of sound and radiant energy waves. Since the cellulose is inherently flammable, a fire retardant agent is necessarily introduced to the hammermill during processing of the cellulose. The fire retardant agent should be dry in form, and would preferably constitute boric acid of the like. The boric acid may be fed to the hammermill through an auger or other appropriate means. It is here discovered that the corrosive effect of boric acid may be neutralized by introduction of the aforementioned expanded glass. Although the borax or the like used heretofore was effective for neutralizing or buffering the boric acid, it had no other beneficial effect upon the insulating composition and in fact had several adverse effects. It first produced excessive dust which was difficult to combat and increased adversity of the working environment. Furthermore, it added weight to the insulating composition, and this weight provided no advantage. But more so, it added nothing to the objective of the product itself, namely reduction of thermal transmission through the insulating medium. Of prime importance, however, was the cost which borax or the like added to the finished product, since the necessary borax quantity of neutralizing the boric acid often ran to over 20% of the total material weight. Thus, the cost of chemicals for the insulating composition was a significant factor, since the cost of cellulose (paper) constitutes a relatively low cost component in the overall product. In substitution of the expanded glass component proposed herein markedly reduces the overall weight of the insulator composition. Furthermore, as explained above, it effectively buffers the boric acid of the composition. A third advantage in use of the expanded glass resides in the markedly improved thermal insulation provided to the finished product, and there is, therefore, provided a resultant thermal insulation which is lower in cost, lighter in weight, and superior in its principal function, namely thermal insulation.

In manufacture practice, the pulverizing of the cellulose preferably takes place in a first hammermill, whereafter the cellulose of lint-like consistency is automatically withdrawn such as through a conduit, and transferred to a second hammermill where the boric acid is augered into the processed cellulose during its movement within the second hammermill. Thereafter, the cellulose is removed from the second hammermill and drawn into an agitating bin. Transfer may take place by the inherent centrifugal force of the cellulose allowing it to be blown into a transfer conduit containing a cyclone in operative communication with the conduit and an accumulator bin there beneath. The cyclone is intended to remove the dust and allow filtration of the cellulose into the bin. There is also disposed in communicating relation with the bin a reservoir supply of expanded glass, which is introduced thereto and interspersed with the cellulose-boric acid by a plurality of appropriate agitators, which thoroughly mix the glass into and through the cellulose. The finished product is then intermittently withdrawn from the agitator bin and prepared for packaging in appropriate form and size.

DESCRIPTION OF THE PREFERRED EMBODIMENT

In a preferred embodiment of the invention wherein the insulating material is manifest in the form of loose-fill, relatively inexpensive in cost, yet meeting the required Government standards for insulating material, the product manifests itself as follows:

(1) paper—70% by weight
(2) boric acid—10-½% by weight
(3) glass—19-½% by weight In the above mixture, and generally, it is suggested that the boric acid constitute approximately 15% by weight of the cellulose, which, in example (1) above, constitutes approximately 10-½% by weight of the total. Therefore, the remainder would exist in the form of glass, this being 19-½%. In a second example, the following mixture may be proposed wherein the weight of cellulose is significantly greater, and thus requires a larger amount of boric acid to impart a heat resistant and flame retardant character.

EXAMPLE 2

(1) paper—80% by weight
(2) boric acid—9.6.%(15% of 80%) by weight
(3) glass—10.4% by weight Here it would be found that the thermal insulation of the composition will be somewhat less than that to be expected from the composition of Example 1, due to the increased overall bulk of cellulose and the reduced component of glass. Since a decreased component of glass will tend to increase thermal transmission, it will be recognized that the insulating characteristic of this Example (2) is less than that of Example 1.

In a third example of the invention, there is set forth a relatively expensive thermal insulator composition due to the existence of a high component of expanded glass and a relatively low component, by weight, of cellulose. The thermal insulating characteristics of this composition, however, are markedly superior to either of the compositions set forth in Examples (1) or (2).

(1) cellulose—30% by weight
(2) boric acid—4.5% by weight (15% of 30%)
(3) glass—65.5% by weight In experimentation, it has been found that the boric acid component in a range of about 10% by weight or less of the total, is considered relatively low, and that likewise the weight of glass at 10% or less of the total is likewise considered low. In such a composition, there would, of course, be 80% by weight of cellulose. So long as the respective components of boric acid and glass are both at around 10% or less (either), their comparative amount is approximately the same, and no significantly discernible change occurs in the thermal insulation efficiency of the product. If the two ingredients (boric acid and glass) begin to exceed about 10% each by weight of the total, it is found that the glass component may be increased in relation to the desired thermal insulation characteristic in the final product, and independently of the boric acid component in the mixture. Thus, the following extremely low heat transmission thermal insulator may be prepared:

EXAMPLE 4

(1) cellulose—65% by weight
(2) boric acid—11% (15% of 65%) by weight
(3) glass—24% by weight Thus it will be recognized that the percentage of boric acid shall always be based upon the amount of cellulose in the final product, and that this shall be and constitute approximately 15% of the cellulose, by weight, until the amount of boric acid approximates 10% of the total weight of the mixture. Once the boric acid approximates 10%, more or less, of the total weight of the mixture, it is permissible to add glass in any amount desired and in relation to the heat insulation characteristics which are sought. It readily appears, therefore, that a cellulose component in the range of 70% by weight will produce a boric acid requirement of 10-½% by weight of the total (boric acid constituting 15% by weight of the cellulose equalling 15% times 70% equals 10.5%). Therefore, the balance of the composition would necessarily comprise 19-½% by weight of total of glass; see Example (1).

Numerous experiments have been conducted with the subject thermal insulator to determine the efficiency thereof. In one such experiment, a fire test was conducted on five steel plates sprayed with the subject thermal insulator. The thermal insulator was mixed with adhesives, as is commonly done when the insulating material is blown onto an interior ceiling or beam, the adhesive being simultaneously blown into the stream of the insulator so as to affix the insulating material to the wall surface. During the course of this experimentation, both the characteristics of the adhesive under elevated temperature and the thermal insulating efficiency of the material were observed. Only the latter is here relevant, and the results are therefore set forth.

The overall steel plate dimensions were 42"×42"×¼". On one side of each plate was sprayed with the subject thermal insulation material and was identified as:

| PLATES | THICKNESS (IN.) | ADHESIVE TYPE |
| --- | --- | --- |
| 1 | 1.0 | A |
| 2 | 1.5 | A |
| 3 | 1.0 | B |
| 4 | 1.5 | B |
| 5 | 1.5 | C |

The tests were conducted at the Smither's Fire Technology Laboratory located in Ravenna, Ohio. The furnace used in this test measures 3 ft.×3 ft.×3 ft. The outside construction is steel and the furnace is lined with a ceramic refractory insulation (Kaowool-Babcock & Wilcox Mfg.). The furnace dimensions inside the insulation are 27 in.×27 in.×27 in. A single burner is centered vertically in the wall opposite the sample. This burner is rated for 1.5 million BTU/hour and is of the flat flame or non-impinging flame design. The burner and air supply are designed to cover a wide range of air-to-fuel ratios. Furnace conditions are monitored by three Inconel-sheathed chromel-alumel thermocouples. Two positioned 8 inches from the face of the sample and the third positioned 12 inches away.

The exterior surface temperature of each steel plate was monitored by six chromel-alumel thermocouples positioned at separate locations. Each of the six thermocouples were covered with a 6 in.×6 in. insulating pad having essentially the same characteristics as described for the asbestos pads in Appendix A2 of ASTM E119-76.

The thickness of the coating on each of the plates was 1 inch. There follows a time-temperature table compiled during the tests aforedescribed:

| TIME (MINUTES) | AVERAGE STEEL TEMP. (°F.) THERMOCOUPLE NOS. | | | | | | AVERAGE FURNACE TEMP. (°F.) |
| --- | --- | --- | --- | --- | --- | --- | --- |
| | 1 | 3 | 6 | 9 | 10 | 12 | |
| 0 | 65 | 70 | 70 | 65 | 65 | 65 | 70 |
| 10 | 70 | 70 | 70 | 65 | 70 | 70 | 1235 |
| 20 | 130 | 145 | 120 | 130 | 145 | 135 | 1435 |
| 30 | 185 | 190 | 170 | 185 | 195 | 185 | 1515 |
| 40 | 200 | 195 | 200 | 195 | 205 | 200 | 1555 |
| 50 | 245 | 325 | 210 | 220 | 305 | 250 | 1640 |
| 60 | 375 | 465 | 305 | 330 | 455 | 375 | 1670 |
| 80 | 605 | 745 | 595 | 565 | 780 | 595 | 1735 |
| 100 | 1000 | 1165 | 975 | 930 | 1105 | 850 | 1785 |

AVERAGE TIME TO TEMPERATURE:

| TIME (MIN.) | AVG. STEEL TEMP. (°F.) | THERMOCOUPLE INSTALLATION |
| --- | --- | --- |
| 102 | 1000 | 1 3 6 / 9 10 12 |

In another experiment, the coating thickness on the plates was increased to 1.5 inches. The following is a time-temperature table conducted during the experiment aforedescribed:

| TIME (MINUTES) | AVERAGE STEEL TEMP. (°F.) THERMOCOUPLE NOS. | | | | | | AVERAGE FURNACE TEMP. (°F.) |
| --- | --- | --- | --- | --- | --- | --- | --- |
| | 1 | 3 | 6 | 9 | 10 | 12 | |
| 0 | 70 | 70 | 85 | 70 | 70 | 70 | 190 |
| 10 | 70 | 75 | 70 | 75 | 85 | 80 | 1270 |
| 20 | 120 | 130 | 90 | 120 | 145 | 135 | 1435 |
| 30 | 165 | 185 | 135 | 165 | 185 | 170 | 1530 |
| 40 | 185 | 185 | 160 | 175 | 190 | 175 | 1570 |
| 50 | 185 | 185 | 165 | 180 | 245 | 195 | 1640 |
| 60 | 195 | 195 | 180 | 240 | 325 | 235 | 1675 |
| 70 | 260 | 245 | 200 | 335 | 440 | 305 | 1700 |

AVERAGE TIME TO TEMPERATURE:

| TIME (MIN.) | AVG. STEEL TEMP. (°F.) | THERMOCOUPLE INSTALLATION |
| --- | --- | --- |
| 102 | 1000 | 1 3 6 / 9 10 12 |

The amorphous expanded silicate glass referred to herein is commonly available in the market place and is marketed by both the Diamond Shamrock Corporation of Cleveland, Ohio, and Insulation Distributors, Inc. of Shreveport, Louisiana, under the trademarks "Daccotherm" and "Fireproof" respectively. Reference to the term "glass" herein, however, is intended to refer to any type of expanded glass product. The glass hereof is generally absorbant of water and will retain 10% to 15% by weight in moisture, even while in the hammermill, where elevated temperatures are produced by reason of the rotating action of the hammers. Although boric acid retains water, its moisture content is markedly reduced by the elevated temperatures produced within the hammermill and which elevated temperatures tend to heat the cellulose surrounding the boric acid ingredient. It has been found that the flame reduction propensity imparted to the cellulose by the boric acid may be enhanced by the introduction of live steam to the cyclone intermediate the first and second hammermill operations. The introduction of such live steam enhances the boric acid function, since the water has been baked out of the boric acid by the high temperatures (150° F.) achieved in the first hammermill, and it has been baked out of the glass during the popping operation thereof.

It has been found that reduction of the component of expanded glass much below that (by weight) of boric acid, may cause substantial reduction in the PH factor of the finished product, and as a result, application of the product to structural beams of metal produces excessively corrosive results. It thus becomes desirable to maintain the PH factor in the range of 7 to 7.2 or above. If it is desired to modify the aforedescribed composition to impart any of the aforedescribed compositions to impart fireproof characteristics thereto, as opposed to mere heat insulation characteristics, one could do so by significantly increasing the proportion of expanded glass while reducing the proportion of cellulose therein. In this circumstance, the cellulose serves primarily as a binder for the purpose of preventing the expanded glass component from cracking under intense heat. Thus, once the maximum practical amount of glass is incorporated into the mixture, the fire wall rating of the product is primarily influenced by the thickness thereof. Standard criterion set forth by the Consumer Products Safety Commission for a Class I insulation calls for boric acid content of less than 15%, and it has been found entirely feasible to accomplish a Class I insulation designation in accordance with the invention as follows:
(1) boric acid—10%
(2) cellulose—75%
(3) glass—15%
(all by weight).

Therefore, that which is claimed and desired to be secured by United States Letters Patent is:

1. A thermal insulating composition comprising a mixture of:
   cellulose in an amount by weight of from sixty-five percent (65%) to eighty percent (80%) of total weight, for contributing bulk to the composition.
   boric acid in an amount of from four and one-half percent (4.5%) to twelve percent (12%) of total weight, and
   a glass in an amount of from eight percent (8%) to sixty-five percent (65%) of total weight, for neutralizing the corrosive effect of said acid.

2. The thermal insulating composition of claim 1, wherein the relative component amount by weight of cellulose (to the total) is reduced and the relative component amount by weight of said heat expanded silicate glass (to the total) is increased in order to achieve increasingly superior heat insulation characteristics until a level of fire retardency is reached.

3. The thermal insulating compound of claim 1, wherein the relative component amount by weight of cellulose (to the total) is increased and the relative component amount by weight of said heat expanded silicate glass (to the total) is reduced to produce decreasing heat insulation characteristics and concomitantly minimizing fire retardency traits of the composition.

4. The thermal insulating composition of claim 1, wherein the glass is selected from a group consisting essentially of:
   silicate;
   perlite;
   zonalite; or
   fermiculite.

5. The thermal insulation composition of claim 4, wherein the glass is an expanded glass.

6. The thermal insulator composition of claim 5, wherein the relative proportion by weight of heat expanded glass to boric acid is maintained to produce a Ph factor in the range of from 7.0 to 7.2 when said thermal insulation composition is applied to metal.

7. The thermal insulating composition of claim 1, wherein the physical consistency of said thermal insulating composition is of a granular state.

8. The thermal insulating composition of claim 1, wherein the physical consistency of said thermal insulating composition is of a liquid state to facilitate the spray-on application thereof.

9. The thermal insulating composition of claim 1, wherein the physical consistency of said insulating composition is one or more layers existing to provide thermal insulation after application to any surface.

10. The process for preparing the thermal insulation composition of claim 1, comprising the steps of:
    introducing said cellulose into a hammer mill or the like and processing the cellulose therein until it achieves a fibrous lint-like consistency.
    introducing boric acid to the cellulose in sufficient quantity to substantially remove its flammability,
    interspersing said acid in homogenious manner throughout the cellulose, to form a cellulose acid mix,
    introducing said cellulose acid mix to said glass, said glass to neutralizing the acidic character of said cellulose acid mix and enhancing the thermal insulation of the resulting mixture.

11. The method of claim 10, wherein an additional step comprises:
    introducing moisture to the composition to partially restore limited water to the said resulting mixture.

12. The process of claim 1, wherein the glass is an expanded glass.

13. A thermal insulating composition wherein the exact composition is specified by first selecting the precent by weight of cellulose (to the total) desired of from sixty-five percent (65%) to eighty percent (80%),
    then determining the percent by weight of acid (to the total) by multiplying said selected percent by weight of cellulose (to the total) by fifteen percent (15%),
    then determining the percent by weight of glass (to the total) by substracting the sum of said selected percent by weight cellulose and said determined percent by weight acid from one hundred percent (100%).

14. The thermal insulating composition of claim 13, wherein the glass is selected from a group consisting essentially of:
    silicate;
    perlite;
    zonalite; or
    fermiculite.

15. The thermal insulation composition of claim 14 adapted for application to building structures in the form of a loosefill or spray-on installation, wherein the low density of said glass serves to reduce the composite density of said thermal insulation composition.

16. The thermal insulating composition of claim 13, wherein the relative component amount by weight of cellulose (to the total) is reduced and the relative component amount by weight of said heat expanded silicate glass (to the total) is increased in order to achieve increasingly superior heat insulation characteristics until a level of fire retardency is reached.

17. The thermal insulating compound of claim 13, wherein the relative component amount by weight of cellulose (to the total) is increased and the relative component amount by weight of said heat expanded silicate glass (to the total) is reduced to produce decreasing heat insulation characteristics and concomitantly minimizing fire retardency traits of the composition.

18. The thermal insulating compositions of claim 19, wherein the physical consistency of said thermal insulating composition is of a granular state.

19. The thermal insulating composition of claim 14, wherein the physical consistency of said thermal insulating composition is of a liquid state to facilitate the spray-on application thereof.

20. The thermal insulation composition of claim 14, where the glass is an expanded glass.

* * * * *